Figure 1:
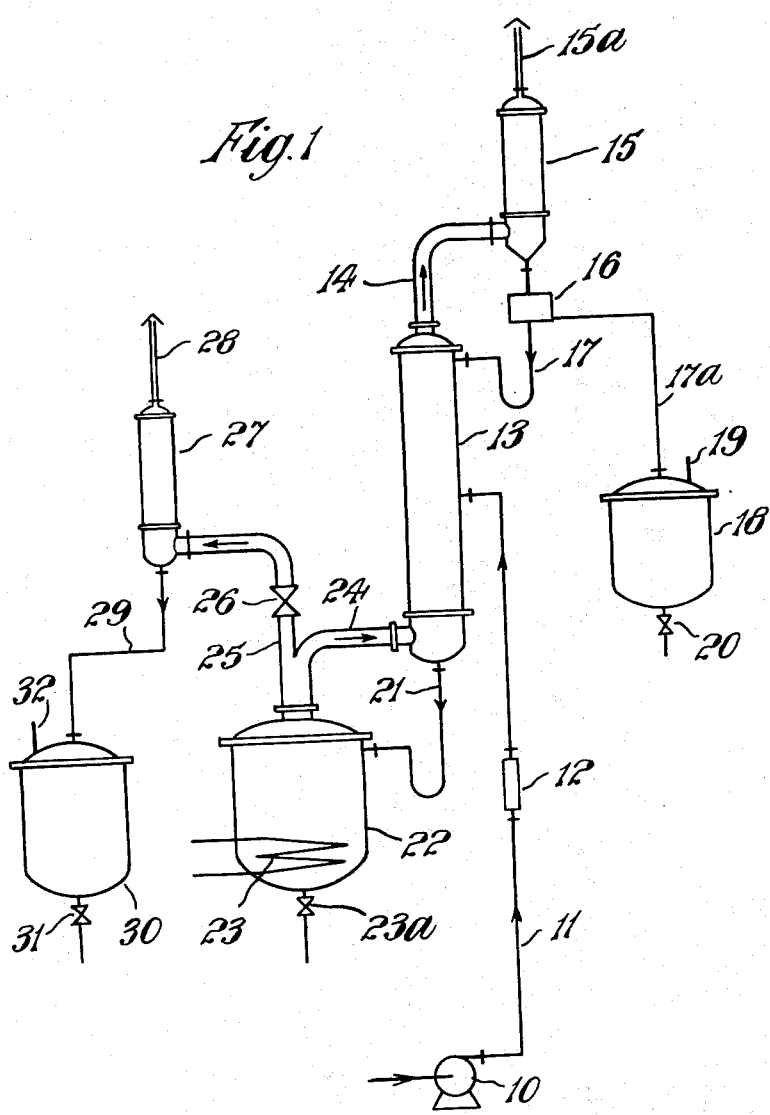

Dec. 10, 1963     J. G. BLITZ     3,113,909
DISTILLATION PROCESS AND APPARATUS
Filed Jan. 27, 1960     2 Sheets-Sheet 1

INVENTOR
JOSEPH GERRIT BLITZ

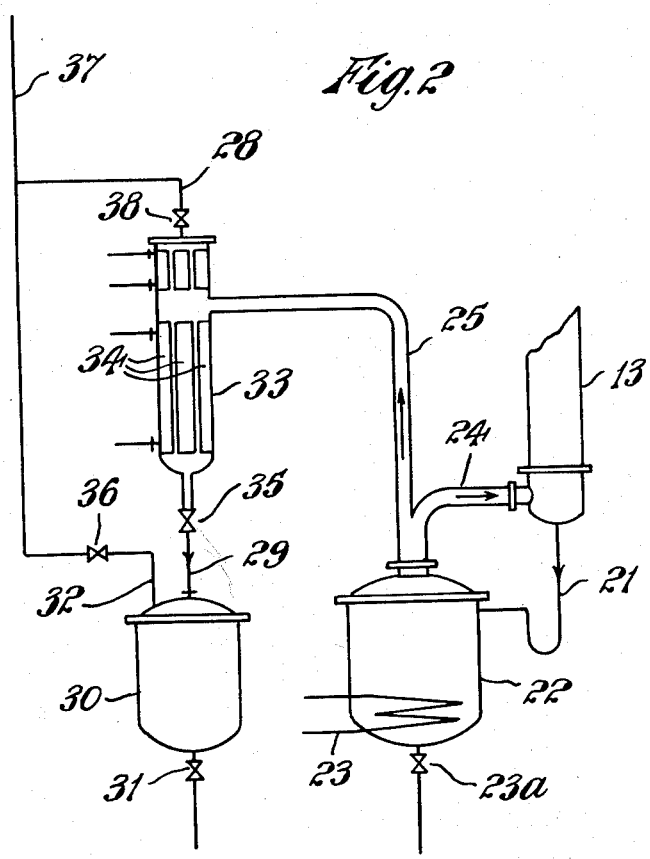

3,113,909
Patented Dec. 10, 1963

3,113,909
DISTILLATION PROCESS AND APPARATUS
Joseph Gerrit Blitz, Vlaardingen, Netherlands, assignor to Unilever N.V., Rotterdam, Netherlands, a company of the Netherlands
Filed Jan. 27, 1960, Ser. No. 4,979
Claims priority, application Great Britain Feb. 2, 1959
4 Claims. (Cl. 202—70)

This invention relates to distillation and provides an improved method of, and apparatus for, continuously fractionating liquid mixtures, for example, mixtures of alcohols and/or aldehydes and/or ketones, and/or fatty acids, by distillation.

Continuous fractional distillation of such mixtures is commonly carried out by feeding the mixture into a fractionating column some distance above the bottom, removing a vapour phase "top fraction" from the top of the column, condensing this, recovering part of the distillate and returning the rest to the top of the column, down which it flows becoming progressively richer in the less volatile constituent, removing a liquid "bottom fraction" from the bottom of the column, recovering part of this and evaporating the remainder and returning the vapour thereof to the bottom of the column, where it forms an ascending current making intimate contact with the descending current of liquid and becoming progressively richer in the more volatile constituent, these operations being carried out continuously.

A disadvantage of the method described above is that any non-volatile impurities which are present in the initial mixture or are formed during distillation accumulate in the bottom fraction and contaminate the product recovered therefrom. The present invention provides a method whereby this disadvantage can be avoided.

In the process of the invention, instead of obtaining the yield of the less volatile fraction directly in liquid form from the bottom of the column, liquid from the bottom of the column is evaporated, part of the vapour so formed is fed back into the bottom of the column and the remainder is condensed and recovered substantially free from non-volatile constituents, such constituents collecting in the zone in which this evaporation is effected.

Thus, in the process of the invention the liquid to be fractionated is fed into the descending liquid stream in a fractionating zone below the point at which the vapour of the ascending stream is drawn off (to be condensed, part being recovered and part fed back to the top of said zone) and a bottom fraction is drawn off from the bottom of said zone and vapourised, part being condensed and recovered and part being fed back in the vapour phase to the bottom of said zone.

Apparatus suitable for carrying out this process comprises: a fractionating column and auxiliary equipment arranged for the continuous fractionation of a liquid mixture fed into said column, into a more volatile top fraction and a less volatile bottom fraction, said column having an outlet for bottom fraction liquid and an inlet near the base for bottom fraction vapour, an evaporator external to said column for evaporating bottom fraction liquid, the liquid space in said evaporator being connected to said outlet, a connection between the vapour space of said evaporator and said inlet, a condenser for bottom fraction vapour, a connection between said condenser and said vapour space and means for controlling the relative proportions of vapour flowing through the respective connections. The condensate outlet for the condenser may be connected to a suitably vented receiver for the condensate.

A preferred method of controlling the proportion of bottom fraction vapour that is returned to the bottom of the column is by controlling the rate at which condensation of the remainder of said vapour occurs. This may be done by arranging that said condensation is effected by cooling surfaces partly immersed in a body of the condensate and controlling the rate at which condensate is drawn off from said body, whereby, if the rate of condensation tends to exceed the predetermined rate at which condensate is drawn off, the resulting diminution of exposed cooling surface due to increases in the depth of the body of condensate will reduce the rate of condensation until the situation is restored. This method of control is of particular advantage where fractionating under pressures other than atmospheric, for instance fluctuating pressure such as may occur when fractionating under vacuum.

In apparatus suitable for operating the preferred method under pressures other than atmospheric, especially under vacuum, the condensate outlet of the condenser is controlled by a valve and the condenser is arranged to operate with part of the cooling surface immersed in condensate to a depth that can be controlled by the setting of said valve, since, if the condensate level should rise slightly, cooling is reduced owing to the smaller cooling surface exposed, since less of the bottom fraction vapour is condensed and the condensate level in the condenser sinks, as condensate flows through the valve, to the predetermined value. It will be appreciated that by controlling in this way the rate of condensation in the condenser and the rate at which condensate flows therefrom, the relative ratio of vapour flow to the condenser and back to the column can be controlled in spite of any fluctuations in pressure. When working under pressures other than atmospheric the valve-controlled condensate outlet from the bottom fraction condenser leads to a receiver having a valve-controlled vent and the vents from the top-fraction condenser and top-fraction receiver are also provided with valves so that the pressure within the system can be controlled. When working under reduced pressures these various valve-controlled vents are connected to the vacuum line.

The invention is explained in further detail below with reference to the accompanying diagrammatic drawings in which:

FIG. 1 shows by way of example equipment for separating by distillation a mixture of two components into a top fraction and a bottom fraction under atmospheric pressure, and FIG. 2 shows an improved form of part of the equipment shown in FIG. 1 particularly suitable for use when distilling under fluctuating pressure conditions, for example under sub-atmospheric pressure, especially under high vacuum.

Referring to FIG. 1, the mixture of liquid to be treated is charged by means of a pump 10, through a pipeline 11, via a flow-meter 12, into the distillation column 13. In this column separation takes place into a bottom fraction and a top fraction. The top fraction is discharged from the top of column 13 through an outlet 14 and condensed in a condenser 15 provided with a vent 15a. The top fraction condensate from the condenser 15 is divided in the reflux divider 16, and part is refluxed through line 17 into the top of column 13, whereas the remaining part is discharged through line 17a into a receiver 18 equipped with vent 19 and discharge valve 20.

The separated bottom fraction in column 13 is discharged in liquid form through the outlet 21 into an evaporator 22 provided with heating coil 23 and outlet valve 23a. The evaporator, of course, may be of any suitable kind. Particularly suitable are evaporators having one or more evaporating tubes along the inside or outside surface of which the liquid to be evaporated is caused to flow, the heating medium being in contact with the other surface and spray-arresting elements being provided to arrest any drops of liquid thrown off from the tube-wall and conducted back thereto. In the evaporator the liquid bottom fraction is converted into vapour, part of which is returned through the line 24 into column 13, where it provides the heat for effecting the fractionation.

The other part of the bottom fraction vapour from the evaporator 22 is withdrawn through a line 25 via a throttle-valve 26 and condensed in a condenser 27 provided with a vent 28. From the condenser the liquefied bottom fraction is withdrawn through an outlet 29 into a receiver 30 provided with a discharge-valve 31 and vent 32. The throttle-valve 26 is adjusted so that the desired cutting of the starting material into a top fraction and a bottom fraction is attained.

Under non-fluctuating pressures, such as under atmospheric pressure, the distillation can be carried out in this equipment in a constant way without changes in the composition of the top and bottom fractions recovered, once throttle-valve 26 is adjusted to an adequate passage of vapour. However, under fluctuating pressure which may occur for instance, when working under vacuum, the fluctuations will give rise to repeated changes in the vapour velocity in column 13 and consequently also in the resistance in this column thus affecting the pressure difference over the throttle valve 26. The preferred form of equipment which will now be described with reference to FIG. 2 of the drawings is designed to deal with such fluctuations in pressure and is particularly suitable for use when fractionating under reduced pressure.

Referring to FIG. 2: The part of the bottom fraction vapour from the evaporator 22 that is withdrawn through the line 25, is charged into the condenser 33, which is provided with cooling surfaces 34 and with a valve 35 controlling the condensate outlet 29. This valve is adjusted so that a predetermined amount of the condensate is allowed to pass into the receiver 30 which is provided with a discharge valve 31 and with a vent 32, controlled by a valve 36, connected to the main vacuum line 37. The vent 28 of the condenser 33 is connected through a valve 38 to the vacuum line 37, this valve being adjusted so that only the non-condensable gases have leaked into the equipment or originally being dissolved in the starting material are withdrawn. The vent 15a of the top fraction condenser 15 and the vent 19 of the top fraction receiver 18 (both shown in FIG. 1 but not in FIG. 2) are also connected through valves with the vacuum line 37. During the start of the distillation the valve 35 is shut until part of the condenser 33 is filled with liquid bottom fraction, after which the valve 35 is opened to such an extent that the desired amount of liquid is withdrawn so that under stable operating conditions the liquid level in the condenser 33 is constant. When, owing to any fluctuation in the working-pressure, the liquid level in the condenser 33 drops, a greater cooling-surface will be exposed to the vapour, provoking an increase of the vapour passing through the line 25 and consequently counteracting said drop of the liquid level. When, owing to any fluctuation in the working-pressure, the liquid level in the condenser 33 is raised, a smaller cooling-surface will be exposed to the vapour, provoking a decrease of the vapour passing through line 25 and consequently counteracting the rise of the liquid level. Moreover, owing to the liquid head over valve 35, the pressure fluctuations are only a small percentage of the total pressure drop through valve 35.

The following examples illustrate the invention:

*Example 1*

Through line 11 of an equipment according to FIG. 1, operating under normal atmospheric pressure, an amount of 12 kg./h. of a liquid consisting of 25% pentylaldehyde, 70% pentyl alcohol and 5% of chemical condensation products, water and contaminants was charged continuously into distillation column 13.

The ascending vapour in column 13 was drawn off through outlet 14, condensed in condenser 15 and divided in such a way that 3 kg./h. of a top fraction was discharged into receiver 18, and that 30 kg./h. of reflux liquid consisting of 96% of pentylaldehyde, 2% of pentyl alcohol and 2% of water and volatile contaminants was obtained.

The liquid descending in column 13 was discharged into evaporator 22 in which the main part of said liquid was evaporated. From the vapour thus obtained about 7.2 kg./h. was charged through throttle-valve 26 into condenser 27, whilst the rest of the vapour was charged into column 13. About 99% of the liquid condensed in condenser 27 and discharged into receiver 30 consisted of pentyl alcohol, the remainder consisting of water, pentylaldehyde and a negligible amount of chemical condensation products.

In evaporator 22 the less volatile chemical condensation products together with pentyl alcohol accumulated (about 1.8 kg./h.). The accumulated products consisting of about 33% of chemical condensation products and 66% of pentyl alcohol, were intermittently discharged.

In most parts of the equipment the pressure was substantially equal to normal atmospheric pressure; in evaporator 22 the pressure amounted to some mm. mercury above normal atmospheric pressure, owing to the pressure drop in column 13.

*Example 2*

In an improved equipment as shown in part in FIG. 2 the pressure in the vacuum lines amounted to an absolute pressure of 7 mm. mercury. Except for valve 38 all vacuum-valves were opened wide. Thus the absolute pressure in parts 15, 18 and 30 was also approximately 7 mm. mercury. Valve 38 was throttled to a great extent so that the absolute pressure in condenser 33 amounted to 8.5 mm. mercury. The pressure difference at both sides of valve 35 amounted to $8.5-7=1.5$ mm. mercury, to which must be added the pressure of about 1 metre of liquid above valve 35 ($\pm 60$ mm. mercury) so that there was a total pressure difference of about 61.5 mm. mercury.

Distillation column 13 was charged continuously with 88 kg./h. of a dark reddish-brown coloured fatty acid mixture composed as follows:

|  | Percent |
|---|---|
| $C_{10}$ | A trace |
| $C_{12}$ | About 44 |
| $C_{14}$ | About 21 |
| $C_{16}$ | About 15 |
| $C_{18}$ | About 19 |
| Glycerides | About 1 |

The vapours ascending in column 13 were drawn off, condensed and divided as in Example 1, into a top fraction amounting to 31 kg./h. and a reflux liquid amounting to 200 kg./h. This condensed product consisted of 99.7% of $C_{12}$ fatty acid (lauric acid) with traces of other fatty acids.

The liquid discharged from the bottom of column 13 was charged into evaporator 22 in which the main part of said liquid was evaporated. Part of the vapours thus obtained was charged into column 13, whilst the remainder was charged into condenser 33. From this condenser an amount of 56 kg./h. was discharged through valve 35 into receiver 30. This liquid was composed as follows:

|  | Percent |
|---|---|
| $C_{12}$ | 14 |
| $C_{14}$ | 33 |
| $C_{16}$ | 23.5 |
| $C_{18}$ | 29.5 |

Its colour determined in a 5¼" Lovibond-cell was 15 yellow and 1.7 red.

In condenser 33 the liquid level was adjusted automatically so that sufficient condensing surface was free for condensing 56 kg./h. of vapour from evaporator 22.

From the bottom of evaporator 22 an amount of 0.9 kg./h. of a brown-black product was discharged, consisting for more than 50% glycerides, further of high boiling decomposition products of fatty acids and of certain amounts of non-evaporated fatty acids.

I claim:

1. A process for continuously fractionating liquid mixtures by distillation in a column under pressures other than atmospheric which comprises feeding the liquid to be fractionated into a descending stream of reflux liquid in a fractionating zone in said column below the point at which the vapor of the ascending stream is drawn off to be condensed, recovering part of the condensate and feeding it back to the top of said zone, drawing off and then vaporizing a bottom fraction from the bottom of said zone, dividing the vapor from the bottom fraction into two vapor streams, feeding one vapor stream back to the bottom of said zone and condensing the other vapor stream in a condensing zone to form a column of liquid condensate, and continuously withdrawing liquid from the bottom of the column of liquid condensate through an aperture of constant size to a collecting zone during the fractionating process, and maintaining substantially the same pressure in the said collecting zone, fractionating zone and condensing zone.

2. Process according to claim 1, wherein the fractionation is effected under vacuum.

3. Distillation apparatus which comprises a fractionating column and auxiliary equipment arranged for the continuous fractionation under pressures other than atmospheric of a liquid mixture fed into said column into a more volatile top fraction and a less volatile bottom fraction, said column having an outlet for bottom fraction at its base and a vapor inlet above said outlet, an evaporator, a conduit connecting said evaporator with said outlet, a conduit connecting the top of said evaporator with said inlet, a condenser having at its bottom an outlet connected to a receiver, a valve arranged in said condenser outlet, a conduit connecting the top of said evaporator with said condenser above its bottom part, the top of said column and the top of said receiver being connected to a source maintaining a pressure other than atmospheric in said column, evaporator, condenser, receiver and connecting lines.

4. Apparatus according to claim 3 comprising means whereby the whole system can be maintained under reduced pressure.

References Cited in the file of this patent
UNITED STATES PATENTS

| | | |
|---|---|---|
| 1,914,921 | Lacy | June 20, 1933 |
| 2,388,919 | Iverson | Nov. 13, 1945 |
| 2,638,440 | Drout et al. | May 12, 1953 |
| 2,822,322 | Rice | Feb. 4, 1958 |
| 2,915,462 | Salmon | Dec. 1, 1959 |